H. R. STAFFORD.
FLEXIBLE JOINT.
APPLICATION FILED NOV. 1, 1919.

1,345,334.

Patented June 29, 1920.

WITNESS:
Gustav Genzlinger.

INVENTOR
Hal R. Stafford
BY
ATTORNEYS

UNITED STATES PATENT OFFICE.

HAL R. STAFFORD, OF NORTH PLAINFIELD, NEW JERSEY, ASSIGNOR TO FRANKLIN RAILWAY SUPPLY COMPANY, A CORPORATION OF DELAWARE.

FLEXIBLE JOINT.

1,345,334.  Specification of Letters Patent.  Patented June 29, 1920.

Application filed November 1, 1919. Serial No. 335,049.

*To all whom it may concern:*

Be it known that I, HAL R. STAFFORD, a citizen of the United States, residing at North Plainfield, in the county of Somerset and State of New Jersey, have invented certain new and useful Improvements in Flexible Joints, of which the following is a specification.

This invention has reference to an improved form of flexible joint, preferably what is known as a ball joint type and has for its primary object the provision of means for holding the parts which flex or bend in proper relative position during such movement, and in providing separate means for packing the joint, the holding means and the packing means being provided with mechanism whereby each can be properly adjusted without interfering with the other.

A further object of this invention is the provision of a joint of the character specified in which the ball member will be held in place by a couple of bearing rings provided with a suitable adjusting gland arranged so as to facilitate the taking up of wear or the setting of the parts under proper pressure.

In connection with such mechanism I also propose to introduce a packing means preferably composed of a couple of suitable packing rings having a gland for compressing the packing which is separate from the means employed for adjusting the holding rings and arranged so that it can be adjusted to take up wear or fix the compression on the packing without interfering in any way with the adjustment of the holding means.

The above, as well as such other objects as may hereinafter appear, I obtain by means of a construction which I have illustrated in preferred form in the accompanying drawings, wherein—

Figure 1:
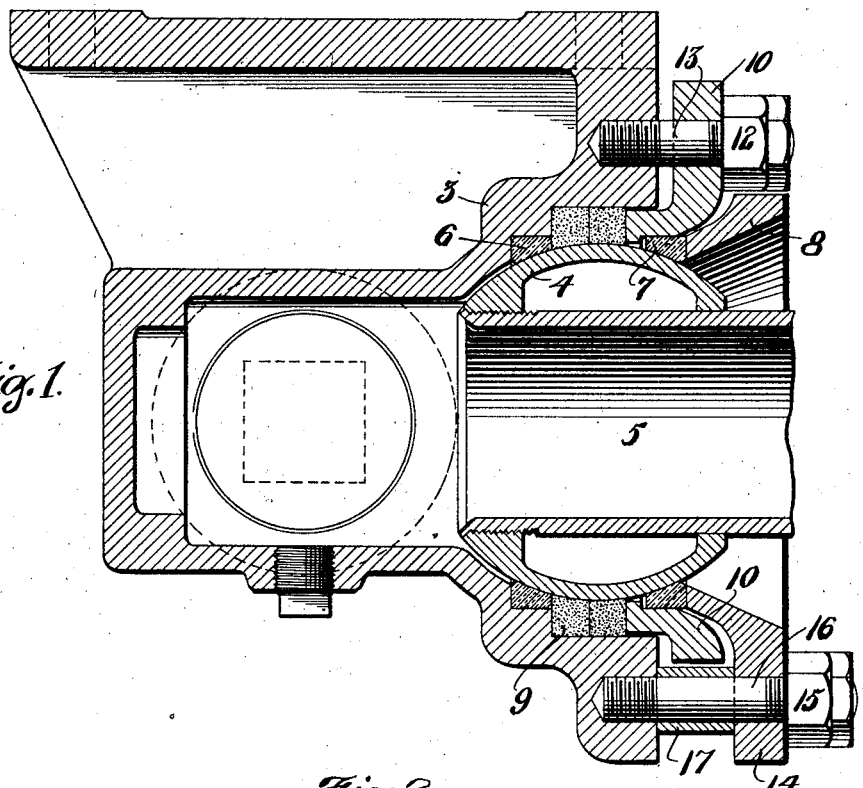
Figure 2:
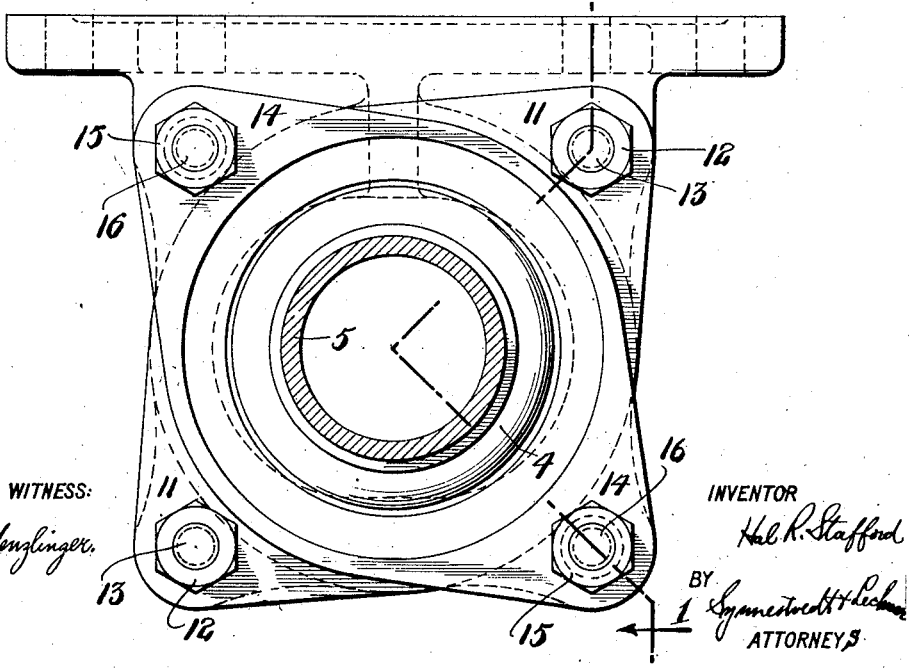

Figure 1 is a longitudinal sectional view through a joint embodying my improvements, and Fig. 2 is a view partly in section showing in elevation the two adjusting glands which I employ.

The socket casting which I have shown at 3 may be in external configuration of any shape desired to adapt it to any particular location or use and housed within the same I have shown a ball member 4 threaded to a tubular extension 5 forming a connection for the pipe, the member 4 being held in proper place within the housing 3 by two holding rings 6 and 7 which are preferably soft metal, the ring 7 being subjected to the pressure of the gland 8. If preferred the holding ring 6 may be made integral with the socket 3.

Between the holding rings 6 and 7 I arrange a suitable packing 9 which is provided with a compression or adjusting means in the shape of a gland 10, the latter having two ears marked 11 which are oppositely placed and are engaged by the adjusting nuts 12 on the bolts 13.

The gland 8 which holds the rings 6 and 7 is provided with two ears 14 that are oppositely placed in a line at a right angle to the line passing through the ears 11 of the gland 10, and suitable adjusting means is provided for this gland 8 in the shape of the nuts 15 on the bolts 16, the placing of the adjusting devices of each of the two glands 8 and 10 at right angles to each other making it possible to secure independent adjustment of each without interference with the other.

As a means for avoiding too tight a compression upon the holding rings 6 and 7, I prefer to employ a spacer member as indicated at 17 which may be cut to proper size so that when it is compressed by the tension of the nuts 15 and bolts 16, there will be just the right adjustment of the holding rings 6 and 7 such as will avoid binding of the latter upon the ball in such manner as would interfere with the easy bending of the joint.

As the packing 9 wears in use, the gland 10 can be forced to the left by the nuts 12 on the bolts 13 to restore a tight condition in the joint, and this can obviously be done without any interference at all with the adjustment of the gland 8 bearing against the ring 7.

I do not wish to confine myself to holding and packing glands having but two bolts in each, with their respective wings at right angles to each other. It is obvious that by alternating the ears of the holding and packing glands any desired number of bolts could be used in each, as is necessary to adapt my invention to use in larger pipes, such as receiver pipes of Mallet locomotives.

I claim:

1. A flexible joint construction comprising in combination a socket member, a flexibly movable member housed within said socket member, holding means for supporting said two members in proper relative position, means for securing said holding means in place, packing means for the joint, a compression device for the packing, and means for adjusting the holding means and the packing means independently of each other.

2. A flexible joint comprising in combination, a housing member, a member flexibly mounted within said housing member, a pair of holding rings, a plurality of packing rings, and means for adjusting the holding rings and packing rings independently of each other.

3. A flexible joint comprising in combination, a socket member, a ball member housed within said socket member, a pair of holding rings for said ball member, a packing located between said holding rings, a device for securing the holding rings in place, a device for compressing the packing, and means for adjusting the securing means and the packing compressor independently of each other.

4. A flexible joint comprising in combination, a socket member, a ball member housed within said socket member, a pair of holding rings for said ball member, a packing located between said holding rings, a device for securing the holding rings in place, a device for compressing the packing, a gland for the holding rings having securing means on its opposite sides and a gland for the packing having securing means on its opposite sides in a plane at right angles to the plane of the securing means of the first mentioned gland.

5. A flexible joint comprising in combination, a housing member, a member flexibly mounted within and seated against said housing member, a holding ring, a plurality of packing rings, and means for adjusting the holding ring and packing rings independently of each other.

In testimony whereof, I have hereunto signed my name.

HAL R. STAFFORD.